United States Patent [19]
McNair

[11] Patent Number: 5,265,191
[45] Date of Patent: Nov. 23, 1993

[54] TECHNIQUE FOR VOICE-BASED SECURITY SYSTEMS

[75] Inventor: Bruce E. McNair, Holmdel, N.J.

[73] Assignee: AT&T Bell Laboratories, Murray Hill, N.J.

[21] Appl. No.: 761,151

[22] Filed: Sep. 17, 1991

[51] Int. Cl.$^5$ .............................................. G10L 5/00
[52] U.S. Cl. ..................................... 395/2.82; 395/2; 395/2.84; 395/2.56
[58] Field of Search ................. 381/42, 43, 51; 395/2, 395/2.82, 2.84, 2.56

[56] References Cited

U.S. PATENT DOCUMENTS

| | | | |
|---|---|---|---|
| 4,449,189 | 5/1984 | Feit et al. | 381/42 |
| 4,450,545 | 5/1984 | Kishi et al. | 381/42 |
| 4,653,097 | 3/1987 | Watanabe et al. | 381/42 |
| 4,821,027 | 4/1989 | Mallory et al. | 381/51 |
| 4,825,384 | 4/1989 | Sakurai | 381/43 |
| 4,922,538 | 5/1990 | Tchorzewski | 381/42 |
| 4,961,229 | 10/1990 | Takahash | 381/42 |
| 5,054,082 | 10/1991 | Smith et al. | 381/42 |

Primary Examiner—Michael R. Fleming
Assistant Examiner—Tarig R. Hafiz
Attorney, Agent, or Firm—Eugene J. Rosenthal

[57] ABSTRACT

A voice-based security system requires that a series of utterances to be uttered by the requester contain at least one repeated utterance. The system compares a representation of each instance of the repeated utterance as uttered by the requester to both a prestored template for the utterance and to each representation of the other instances of the utterance as uttered by said requester. The requester is authenticated only if each representation of the repeated utterance as uttered by said requester matches the prestored template and the representations of the repeated utterance as uttered by said requester do not match each other to such a high degree that they are deemed to have been mechanically generated.

34 Claims, 3 Drawing Sheets

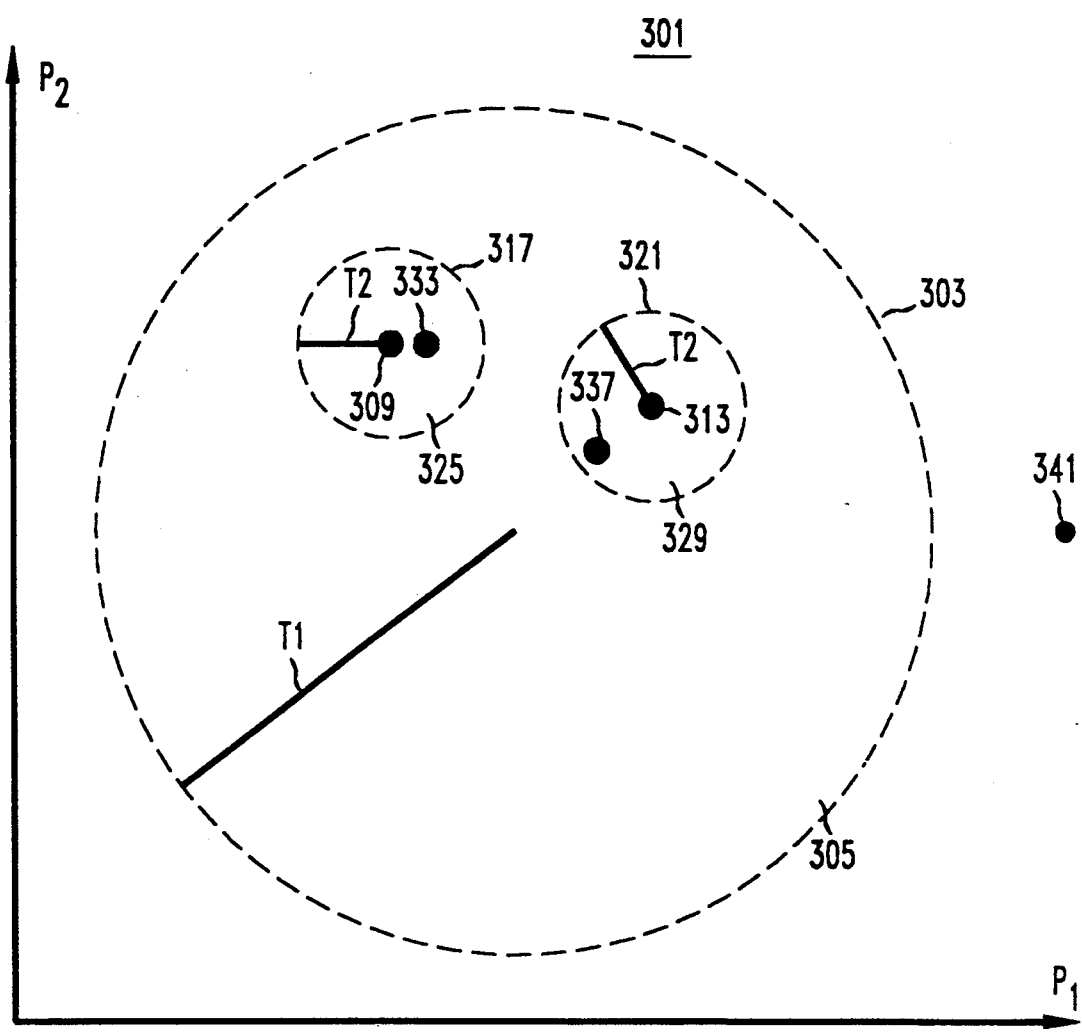

TECHNIQUE FOR VOICE-BASED SECURITY SYSTEMS

TECHNICAL FIELD

This invention relates to voice-based security systems.

BACKGROUND OF THE INVENTION

A requester seeking access to a secured destination often supplies an alleged identity, i.e., he tells who he is. This alleged identity then often needs to be authenticated. That is, confirmation needs to be obtained that proves the requester is actually the person that he claims to be.

Among the known techniques for authenticating the identity of a requester are techniques that take advantage of the uniqueness of each person's voice. In one such technique, the requester is prompted to speak a series of utterances such as a sequence of numbers. The particular utterances which are included in the series, as well as their order therein, may be different each time a particular identity is alleged. Access to the secured destination is granted if the representations of each of the utterances as repeated by the requester match previously stored templates of those utterances, as uttered by the person in question, to within predetermined tolerance limits. Otherwise, access is denied.

A problem with this technique is that utterances made by an authorized person can be mechanically recorded by an attacker seeking fraudulent access to the secured destination. The attacker then requests access, alleging the identity of the authorized person whose utterances he has recorded. In response to the authentication prompt, the attacker causes the recorded utterances to be reproduced in the order that forms the requested series of utterances. Since each utterance of the formed series is reproduced from a recording of the authorized person actually saying the utterance, each element will match its corresponding template to within the predetermined tolerance limits. The attacker will therefore be able to obtain fraudulent access.

SUMMARY OF THE INVENTION

The above-described difficulties with prior voice-based security systems are overcome, in accordance with the principles of the invention, by requiring that the series of utterances to be uttered by the requester contain at least one repeated utterance and comparing a representation of each instance of the repeated utterance as uttered by the requester not only to a prestored template as in the prior art, but also to each representation of the other instances of the utterance as uttered. The requester is authenticated only if a) each representation of the repeated utterance matches the prestored template to within a predetermined tolerance while b) the representations of the repeated utterance do not match each other to such a high degree that they are deemed to have been mechanically generated.

DETAILED DESCRIPTION

Figure 1:
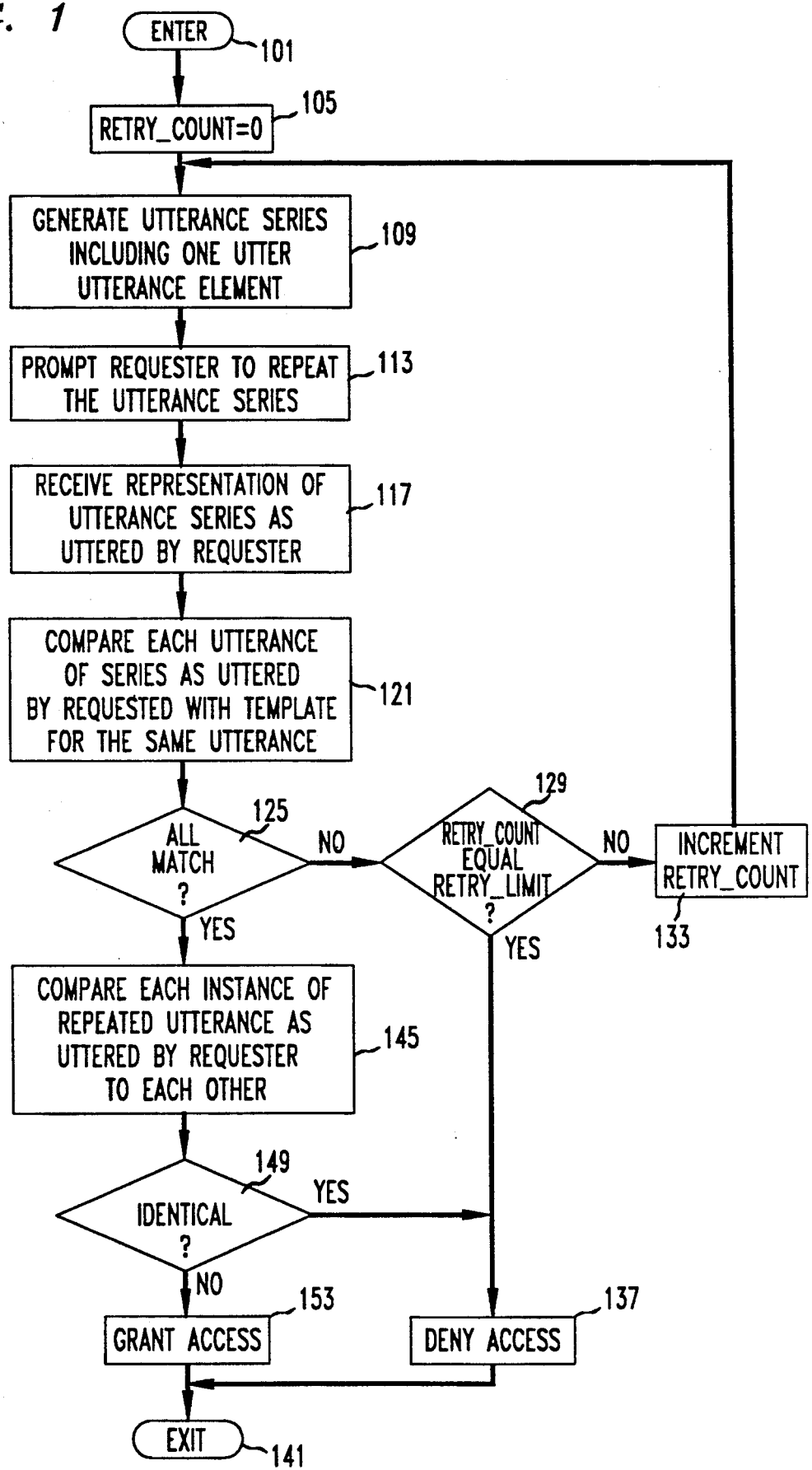
FIG. 1 is a flow chart of an exemplary method for use in voice-based security systems in accordance with the principles of the invention.

Shown in FIG. 1, in flow chart form, is an exemplary method for use in voice-based security systems in accordance with the principles of the invention. The method is entered via step 101 when a security system receives a request for access to a particular destination by a requester who alleges the identity of a user authorized to have access to the particular destination. In step 105 a variable, RETRY_COUNT is set to zero (0). RETRY_COUNT is a count of the number of times the requester has attempted in one access request to achieve access. In step 109, an accordance with the principles of the invention, an utterance series including at least one repeated utterance element is generated. For purposes of clarity of exposition it is assumed herein that only one utterance element is repeated. Extension to applications where more than one utterance element is repeated will be obvious to one skilled in the art.

In step 113 the requester is prompted to utter the utterance series that was generated in step 109. The utterance series as uttered by the requester in response to the prompting of step 113 is received by the security system in step 117. Each received utterance of the utterance series, as uttered by the requester, is compared in step 121 to determine if it matches a prestored template for that utterance as uttered by the authorized user whose identity was alleged. Thereafter, conditional branch point 125 tests to determine if all the utterances of the utterance series, as uttered by the requester, match the prestored templates for those utterances.

If the test result in step 125 is NO, control is passed to conditional branch point 129, which tests to determine if the value of RETRY_COUNT equals RETRY_LIMIT. RETRY_LIMIT and is implementation-dependent constant which controls the number of times a requester may attempt to achieve access in one access request. An exemplary value of RETRY_LIMIT is 2. If the test result in step 129 is NO, control is passed to step 133, in which the value of RETRY_COUNT is incremented. Control is then passed back to step 109. If the test result in step 129 is YES, control is passed to step 137 which causes access to be denied. This may be achieved by playing a message to the requester indicating that access has been denied and disconnecting the requester from the security system. Thereafter, in step 141 the method is exited.

If the test result in step 125 is YES, control is passed to step 141 in which each instance of the repeated utterance as uttered by the requester is compared to each other. In accordance with the principles of the invention, conditional branch point 149 tests to determine if the instances of the repeated utterance as uttered by the requester are identical to each other. If the instances of the repeated utterance are identical, or nearly so, to within a predetermined threshold, this indicates that the utterances were probably reproduced from a recording. Therefore, in accordance with the principles of the invention, if the test result in step 149 is YES control is passed to step 137 which causes access to be denied. Thereafter, in step 141 the method is exited. If the instances of the repeated utterance are not identical, or not nearly so, to within a predetermined threshold, this indicates that the utterances were probably not reproduced from a recording but were instead actually uttered by a human being, most likely the authorized user whose identity was alleged. Therefore, in accordance with the principles of the invention, if the test result in step 149 is NO control is passed to step 153 which causes access to be granted. Thereafter, in step 141 the method is exited.

Many variations of the basic method will be readily apparent to those skilled in the art without departing from the scope or spirit of the invention. Some of the variations include: if no utterance series or an incomplete one is received in step 117, control may be optionally passed to step 129. Also, control may optionally be passed from step 133 back to step 113 rather than step 109. Step 109 may be performed prior to the access request and the generated utterance series made known to the requester in the form of a password. Therefore, at the time of the request, the requester is merely prompted to utter the series which he already knows and control may be passed directly from step 105 to step 113. Furthermore, if the requester knows the series of utterances prior to making a request, he could utter the series at a predetermined point in the request process, e.g., immediately after alleging his identity. It would thus not be required to prompt the requester to utter the utterance series and control may pass from step 105 directly to step 117.

The utterances as uttered by the requester could be processed so as to remove noise, both those in the environment of the requester as well as system caused noise, prior to comparing them to the prestored templates or to each other in steps 121 or 145. Also, one representation of the received repeated utterance as uttered by the requester could be distorted in accordance with distortion techniques (or their inverses thereof) that would still allow the distorted utterance to match the prestored template of the utterance. The resulting distorted representations of the one utterance would also be compared in step 145 to the representation of the other instance of the repeated utterance as uttered by the requester. If any of the distorted representations were found to identically match the other instance of the repeated utterance as uttered by the requester the test result in step 149 would be YES and access would be denied.

Figure 2:
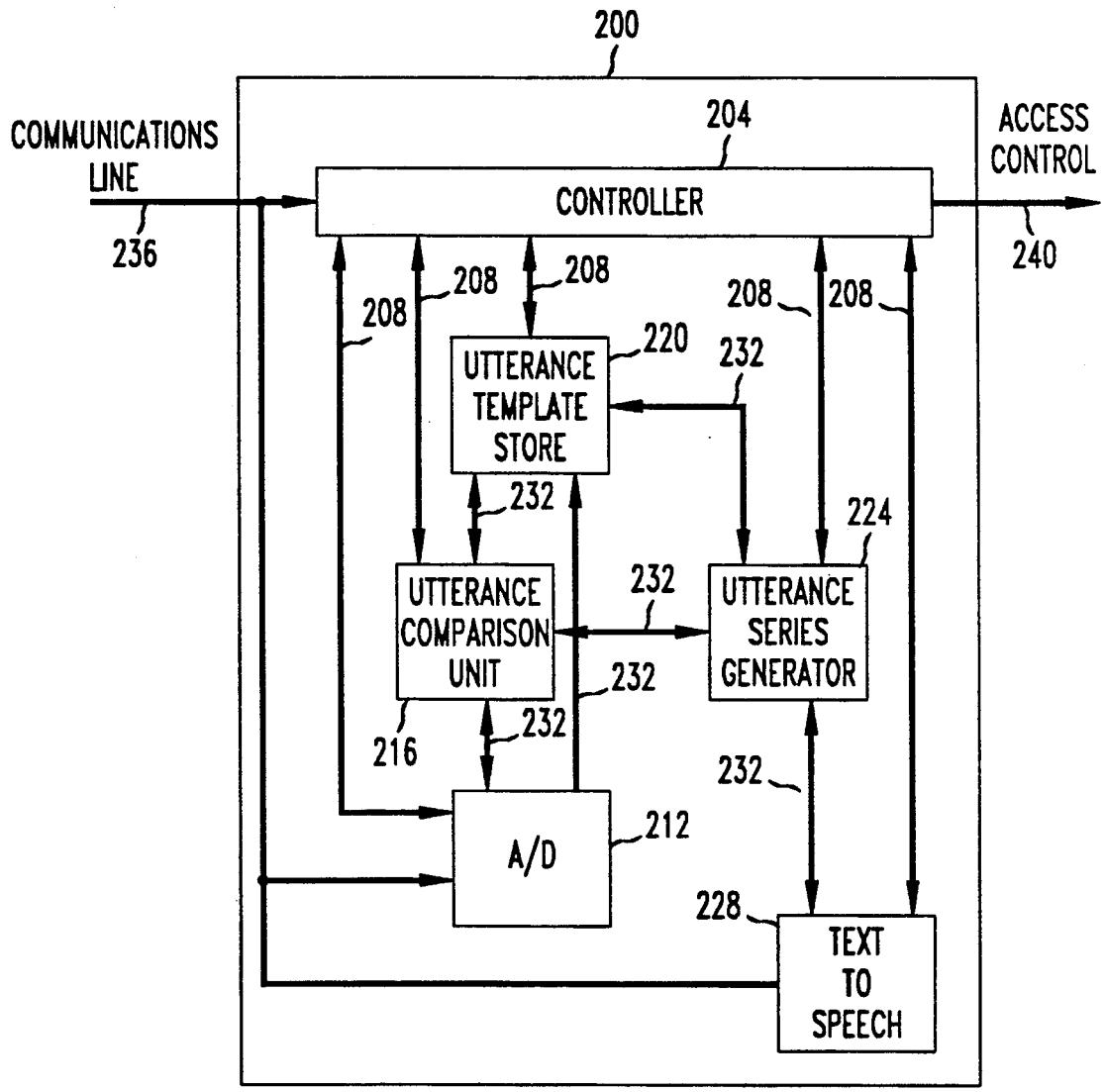
FIG. 2 shows, in simplified block diagram form, an exemplary voice-based security system for executing the method in FIG. 1; and Shown in FIG. 3 is a representative sample space for an utterance for use with the method shown in FIG. 1.

FIG. 2 shows, in simplified block diagram form, exemplary voice-based security system (security system) 200 for executing the method shown in FIG. 1. In the manner shown, controller 204 is connected via bidirectional links 208 to analog to digital converter unit (A/D) 212, utterance comparison unit 216, utterance template store 220, utterance series generator 224 and text to speech unit 228. Bidirectional links 208 need not be identical and may be, at the implementor's discretion, any commonly used communications links such as: serial links, parallel links, shared memory, a common bus or software defined interface. A/D 212, utterance comparison unit 216, utterance template store 220, utterance series generator 224 and text to speech unit 228 are also interconnected in the manner shown by bidirectional links 232. Bidirectional links 232 also need not be identical and may be any commonly used communications links A/D 212, utterance comparison unit 216, utterance template store 220, utterance series generator 224 and text to speech unit 228 may be implemented as any combination of hardware or software. The factors necessary for determining the implementation details will be readily apparent to one skilled in the art.

Controller 204 controls the overall operation, including timing and sequencing, of security system 200. When controller 204 determines that a request for access to a particular destination by a requester who alleges the identity of a user authorized to have access to the particular destination the method shown in FIG. 1 is begun. In the embodiment shown, controller 204 makes this determination by monitoring communications line 236. Also, communications line 236 is a telephone line and controller 204 includes multi-frequency tone detectors and a memory containing a list of authorized users.

Utterance series generator 224 generates the utterance series of step 109 (FIG. 1) which includes a repeated utterance element. The individual utterance elements of the generated utterance series are drawn from those utterance elements having templates stored in utterance template store 220 for the identity alleged by the requester. The generated utterance series is supplied from utterance series generator 224 to text to speech unit 228 for use in prompting the user in step 113 (FIG. 1). The generated utterance series is also supplied to utterance comparison unit 216 for use in comparing the utterances received from the requester with the prestored templates for those utterances and with each other, as called for in steps 121 and 145 in accordance with the principles of the invention.

A/D 212 receives utterances as analog voice via communication lines 236 and converts them into a digital representation. The digital representations of the utterances can be supplied via bidirectional links 232 to either utterance comparison unit 216 or utterance template store 220. When the method shown in FIG. 1 is executed the digital representations are supplied to utterance comparison unit 216 as part of step 117. The digital representations are supplied to utterance template store 220 when the utterance templates for later use are initially stored by each authorized user.

The ultimate decision of whether or not access is to be granted, including the decisions in conditional branch points 125 and 149 is made by controller 204, based on the results of the comparisons performed by utterance comparison unit 216. If access is to be denied, because step 137 has been reached, controller 204 may cause the text of a denial message to be supplied to text to speech unit 228. This message is then converted to speech and spoken to the requester via communication line 236. At the conclusion of the speaking of the denial message controller 204 causes communication line 236 to hang up. If access is to be granted, because step 153 has been reached, controller 204 sends a message via access control link 240 to cause the requester to be granted access to the destination.

Shown in FIG. 3 is representative sample space 301 of an utterance having a prestored template for use with the method shown in FIG. 1. Sample space 301 is defined by axes P1 and P2 which correspond to predetermined parameters of a particular speaker verification system. The selection of such parameters would be readily apparent to one skilled in the art. Threshold 303, as defined by a constant radius T1, represents the outer boundary of match space 305 of sample space 301 in which a match for the utterance may fall. Any representation of the utterance falling within match space 305 is considered a match for the utterance. Any representation of the utterance falling outside match space 305 is considered not to match the utterance. Other well known methods for defining threshold 303, and thereby specifying the boundaries of match space 305, may be used.

Sample point 309 is a representation in sample space 301 of a representation of a first instance of the utterance as uttered by a requester when the utterance is a repeated utterance of an utterance series. Similarly, sample point 313 is a representation in sample space 301 of a representation of a second instance of the utterance as uttered by a requester when the utterance is a repeated utterance of an utterance series. Both sample points 309 and 313 fall within match space 305 and are therefore considered a match for the utterance. Around sample points 309 and 313 are thresholds 317 and 321, respectively, defined by radius T2. Thresholds 317 and 321 define "identical spaces" 325 and 329. Any sample points that fall within the "identical space" of a sample point are considered to be identical for purposes of the comparison in step 149 (FIG. 1). This is because the samples match each other to such a high degree that they are deemed to have been mechanically generated. Thus, sample point 333 is considered identical to sample point 309 and sample point 337 is considered identical to sample point 313.

If the two sample points of the repeated utterance were sample points 309 and 313, as originally mentioned, then the test result in step 125 (FIG. 1) would be YES and the test result in step 149 would be NO. Access would therefore be granted in step 153. If the two sample points of the repeated utterance were sample points 309 and 333 then the test result in step 125 (FIG. 1) would be YES but the rest result in step 149 would also be YES. Therefore, access would be denied in step 137. Likewise, if the two sample points of the repeated utterance were sample points 313 and 337, the test result in step 125 (FIG. 1) would be YES and the test result in step 149 would also be YES. Access would als be denied in step 137. Finally, if sample point 341 was the sample point for one of the repeated utterances, the test result in step 125 would be NO and control passed to step 129 (FIG. 1), regardless of which of the other sample points corresponded to the second sample point. If the RETRY_COUNT equaled the RETEY_LIMIT in step 129, access would be denied in step 137.

The selection of T1 and T2 is implementation dependent. The selection depends upon the tolerance required by the implementor. However, it is necessary that T1>>T2, in the manner shown.

It will be readily apparent to one skilled in the art that the sample space employed need not be limited to two parameters and that any arbitrarily shaped region can be selected to define both match space 305 and "identical spaces" 325 and 329.

I claim:

1. A method for use in a voice-based security system which controls the granting or denial of access to a secured destination, the method comprising the steps of:
   receiving representations of utterances as uttered by a requester for access to said destination, said representations including at least two representations of at least one particular utterance each of said at least two representations being independently developed from separate utterings of said at least one particular utterance;
   comparing each of said received at least two representations of said at least one particular utterance to an at least one previously stored template for said at least one particular utterance as uttered by the individual whose identity was alleged;
   comparing each of said at least two representations of said at least one particular utterance to each other to determine if they are substantially identical; and
   making a determination of whether to grant access or to deny access based on the results of both of said comparing steps.

2. The method as defined in claim 1 wherein said determination is to grant access if each of said at least two representations of said at least one particular utterance as uttered by said requester matches said at least one previously stored template for said at least one particular utterance as uttered by the individual whose identity was alleged and if any of said representations of said at least one particular utternace as uttered by said requester does not identically match any of the other representations of said at least one particular utterance as uttered by said requester.

3. The method as defined in claim 1 wherein said determination is to grant access if each of said at least two representations of said at least one particular utterance as uttered by said requester matches said at least one previously stored template for said at least one particular utterance as uttered by the individual whose identity was alleged to within a first predetermined threshold and if none of said representations of said at least one particular utterance as uttered by said requester matches any other representations of said at least one particular utterance as uttered by said requester to within a second predetermined threshold.

4. The method as defined in claim 3 wherein said first predetermined threshold is greater than said second predetermined threshold.

5. The method as defined in claim 1 wherein said determination is to deny access if each of said at least two representations of said at least one particular utterance as uttered by said requester does not match said at least one previously stored template as uttered by the individual whose identity was alleged for said at least one particular utterance.

6. The method as defined in claim 1 wherein said determination is to deny access if any of said representations of said at least one particular utterance as uttered by said requester identically matches any of the other representations of said at least one particular utterance as uttered by said requester.

7. The method as defined in claim 1 wherein said determination is to deny access if any of said representations of said at least one particular utterance as uttered by said requester matches any other representations of said at least one particular utterance as uttered by said requester to within a predetermined threshold.

8. The method as defined in claim 1 wherein said determination is to deny access if any of said representations of said utterances as uttered by said requester does not match a corresponding previously stored template for said utterance as uttered by the individual whose identity was alleged.

9. The method as defined in claim 1 further including the step of prompting said requester to utter a predetermined series of utterances, said series including at least two instances of at least one particular utterance and representations of said utterances, as uttered by said requester, to be received in said step of receiving.

10. The method as defined in claim 9 wherein said predetermined series of utterances is known to said requester prior to said step of prompting.

11. The method as defined in claim 9 further including the step of generating said series of utterances.

12. The method as defined in claim 1 further including the steps of:
- creating distorted versions of at least one of said at least one particular utterance as uttered by said requester by distorting said representations of said at least one particular utterance as uttered by said requester; and
- comparing said distorted versions of at least one of said at least one particular utterance as uttered by said requester to each of the other representations of said at least one particular utterance as uttered by said requester.

13. The method as defined in claim 12 wherein said determination is to deny access if any of said distorted versions of at least one of said at least one particular utterance as uttered by said requester identically matches any of the other representations of said at least one particular utterance as uttered by said requester.

14. Apparatus for use in a voice-based security system which controls the granting or denial of access to a secured destination, the apparatus comprising:
- means for receiving representations of utterances as uttered by said requester in response to said prompting, said representations including at least two representations of at least one particular utterance each of said at least two representations being independently developed from separate utterings of said at least one particular utterance;
- means for comparing each of said received at least two representations of said at least one particular utterance to an at least one previously stored template for said at least one particular utterance as uttered by the individual whose identity was alleged;
- means for comparing each of said at least two representations of said at least one particular utterance to each other to determine if they are substantially identical; and
- means responsive to all of said means for comparing for making a determination of whether to grant access or to deny access.

15. The apparatus as defined in claim 14 wherein said determination is to grant access if each of said at least two representations of said at least one particular utterance as uttered by said requester matches said at least one previously stored template for said at least one particular utterance as uttered by the individual whose identity was alleged and if any of said representations of said at least one particular utterance as uttered by said requester does not identically match any of the other representations of said at least one particular utterance as uttered by said requester.

16. The apparatus as defined in claim 14 wherein said determination is to grant access if each of said at least two representations of said at least one particular utterance as uttered by said requester matches said at least one previously stored template for said at least one particular utterance as uttered by the individual whose identity was alleged to within a first predetermined threshold and if none of said representations of said at least one particular utterance as uttered by said requester matches any other representations of said at least one particular utterance as uttered by said requester to within a second predetermined threshold.

17. The apparatus as defined in claim 16 wherein said first predetermined threshold is greater than said second predetermined threshold.

18. The apparatus as defined in claim 14 wherein said determination is to deny access if each of said at least two representations of said at least one particular utterance as uttered by said requester does not match said at least one previously stored template as uttered by the individual whose identity was alleged for said at least one particular utterance.

19. The apparatus as defined in claim 14 wherein said determination is to deny access if any of said representations of said at least one particular utterance as uttered by said requester identically matches any of the other representations of said at least one particular utterance as uttered by said requester.

20. The apparatus as defined in claim 14 wherein said determination is to deny access if any of said representations of said at least one particular utterance as uttered by said requester matches any other representations of said at least one particular utterance as uttered by said requester to within a predetermined threshold.

21. The apparatus as defined in claim 14 wherein said determination is to deny access if any of said representations of said utterances as uttered by said requester does not match a corresponding previously stored template for said utterance as uttered by the individual whose identity was alleged.

22. The apparatus as defined in claim 14 further including means for prompting a requester for access to said destination to repeat a predetermined series of utterances, said series including at least two instances of at least one particular utterance.

23. The method as defined in claim 22 further including means for generating said series of utterances.

24. The apparatus as defined in claim 14 further including:
- means for creating distored versions of at least one of said at least one particular utterance as uttered by said requester by distorting said representations of said at least one particular utterance as uttered by said requester; and
- means for comparing said distored versions of at least one of said at least one particular utterance as uttered by said requester to each of the other representations of said at least one particular utterance as uttered by said requester.

25. The apparatus as defined in claim 24 wherein said determination is to deny access if any of said distorted versions of at least one of said at least one particular utterance as uttered by said requester identically matches any of the other representations of said at least one particular utterance as uttered by said requester.

26. The apparatus as defined in claim 14 further including means for stimulating said destination to grant access by said requester to said destination if said determination is to grant access.

27. A method for use in a voice-based security system which controls the granting or denial of access to a secured destination, the method comprising the steps of:
- promoting a requester for access to said destination to repeat a predetermined series of utterances, said series including at least two instances of at least one particular utterance;
- receiving representations of said utterances as uttered by said requester in response to said prompting, said representations including at least two representations of said at least one particular utterance each of said at least two representations being independently developed from separate utterings of said at least one particular utterance; and denying access to said requester if said at least two representation of said repeated utterance as uttered by said requester are so identical to one another that they could not have been uttered so identically by a human being speaking them.

28. A method for use in a voice-based security system which controls the granting or denial of access to a secured destination, the method comprising the steps of:

prompting a requester for access to said destination to utter a predetermined series of utterances, said series including at least two instances of at least one particular utterance;

receiving representations of said utterances as uttered by said requester in response to said prompting, said representations including at least two representations of said at least one particular utterance each of said at least two representations being independently developed from separate utterings of said at least one particular utterance;

comparing each of said received at least two representations of said at least one particular utterance to an at least one previously stored template for said at least one particular utterance as uttered by the individual whose identity was alleged;

comparing each of said at least two representations of said at least one particular utterance to each other to determine if they are substantially identical; and making a determination of whether to grant access or to deny access based on the results of both of said comparing steps.

29. The method as defined in claim 28 wherein said predetermined series of utterances is known to said requester prior to said step of prompting.

30. The method as defined in claim 28 further including the step of generating said series of utterances.

31. A method for use in a voice-based security system which controls the granting or denial of access to a secured destination, the method comprising the steps of:

receiving representations of utterances as uttered by a requester for access to said destination, said representations including at least two representations of at least one particular utterance each of said at least two representations being independently developed from separate utterings of said at least one particular utterance;

comparing each of said at least two representations of said at least one particular utterance to each other to determine their degree of similarity; and denying access to said requester if the degree of similarity between said at least two representations of said repeated utterance as uttered by said requester is such that they could not have been uttered by a human being speaking them.

32. A method for use in a voice-based security system which controls the granting or denial of access to a secured destination, the method comprising the steps of:

receiving representations of utterances as uttered by a requester for access to said destination, said representations including at least two representations of at least one particular utterance each of said at least two representations being independently developed from separate utterings of said at least one particular utterance;

comparing each of said received at least two representations of said at least one particular utterance to an at least one previously stored template for said at least one particular utterance as uttered by the individual whose identity was alleged;

comparing each of said at least two representations of said at least one particular utterance to each other to determine their degree of similarity; and denying access to said requester if either
  (i) said at least two representations of said repeated utterance as uttered by said requester are so identical to one another that they could not have been uttered so identically by a human being speaking them, or
  (ii) any of said at least two representations of said at least one particular utterance does not match with said at least one previously stored template for said at least one particular utterance as uttered by the individual whose identity was alleged to within a predetermined threshold.

33. Apparatus for use in a voice-based security system which controls the granting or denial of access to a secured destination, said apparatus comprising:

means for receiving representations of utterances as uttered by a requester for access to said destination, said representations including at least two representations of at least one particular utterance each of said at least two representations being independently developed from separate utterings of said at least one particular utterance;

means for comparing each of said at least two representations of said at least one particular utterance to each other to determine their degree of similarity; and means for denying access to said requester if the degree of similarity between said at least two representations of said repeated utterance as uttered by said requester is such that they could not have been uttered by a human being speaking them.

34. Apparatus for use in a voice-based security system which controls the granting or denial of access to a secured destination, said apparatus comprising:

means for receiving representations of utterances as uttered by a requester for access to said destination, said representations including at least two representations of at least one particular utterance each of said at least two representations being independently developed from separate utterings of said at least one particular utterance;

means for comparing each of said received at least two representations of said at least one particular utterance to an at least one previously stored template for said at least one particular utterance as uttered by the individual whose identity was alleged;

means for comparing each of said at least two representations of said at least one particular utterance to each other to determine their degree of similarity; and means for denying access to said requester if either
  (i) said at least two representations of said repeated utterance as uttered by said requester are so identical to one another that they could not have been uttered so identically by a human being speaking them, or
  (ii) any of said at least two representations of said at least one particular utterance does not match with said at least one previously stored template for said at least one particular utterance as uttered by the individual whose identity was alleged to within a predetermined threshold.

* * * * *